(12) United States Patent
Koyama

(10) Patent No.: US 7,071,972 B2
(45) Date of Patent: Jul. 4, 2006

(54) DETECTING DEVICE INFORMATION INCLUDING INFORMATION ABOUT A DEVICE

(75) Inventor: Shinichi Koyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/139,397

(22) Filed: Aug. 25, 1998

(65) Prior Publication Data

US 2003/0160869 A1    Aug. 28, 2003

(30) Foreign Application Priority Data

Aug. 26, 1997 (JP) .................................. 9-229475
Aug. 24, 1998 (JP) ................................. 10-237077

(51) Int. Cl.
*H04N 7/00* (2006.01)
*H04N 5/232* (2006.01)
*H04N 5/225* (2006.01)
*G06F 3/00* (2006.01)

(52) U.S. Cl. ............... 348/211.3; 348/552; 348/207.1; 701/9

(58) Field of Classification Search .............. 348/552, 348/14.05, 14.08, 14.11, 14.12, 75, 143, 159, 348/207.1, 207.11, 207.2, 211.3, 211.9, 211.5, 348/211.11, 231.3, 231.6; 710/9
See application file for complete search history.

(56) References Cited

U.S. PATENT DOCUMENTS

| 4,775,931 A | * | 10/1988 | Dickie et al. ................... 710/9 |
| 5,107,256 A | * | 4/1992 | Ueno et al. ................... 348/552 |
| 5,317,693 A | * | 5/1994 | Cuenod et al. ................. 710/9 |
| 5,394,556 A | * | 2/1995 | Oprescu ...................... 709/220 |
| 5,428,748 A | * | 6/1995 | Davidson et al. .............. 710/9 |
| 5,430,525 A | * | 7/1995 | Ohta et al. ................... 399/366 |
| 5,502,727 A | * | 3/1996 | Catanzaro et al. ........... 348/552 |
| 5,530,896 A | * | 6/1996 | Gilbert ........................... 710/9 |
| 5,541,662 A | * | 7/1996 | Adams et al. ............... 348/460 |
| 5,640,594 A | * | 6/1997 | Gibson et al. ................. 710/9 |
| 5,666,159 A | * | 9/1997 | Parulski et al. ............. 348/211 |
| 5,666,557 A | * | 9/1997 | Cassidy et al. ................ 710/8 |
| 5,692,134 A | * | 11/1997 | Wang et al. ................. 710/104 |
| 5,737,491 A | * | 4/1998 | Allen et al. ................. 246/124 |

(Continued)

FOREIGN PATENT DOCUMENTS

EP        0 552 873        7/1993

(Continued)

OTHER PUBLICATIONS

"Architected Configuration for RISC/6000 PowerPC 32-bit Systems that have 6CC-MXX as System Bus", IBM Technical Disclosure Bulletin, vol. 38, No. 3, Mar. 1995, pp. 351-354, XP000508075, New York US * the whole document.

*Primary Examiner*—Ngoc-Yen Vu
*Assistant Examiner*—John M. Villecco
(74) *Attorney, Agent, or Firm*—Fitzpatrick, Cella, Harper & Scinto

(57) ABSTRACT

The present invention provides for detecting device information including information about a device. First ID information is obtained which is specific to the device via a digital interface after second ID information is assigned to the device, wherein the first ID information includes the device information, and the second ID information is used for communicating with the device. The first ID information and the second ID information are stored in a memory. The device information is detected from the first ID information. A new second ID information is checked using the first ID information, if the new second ID information is assigned to the device.

30 Claims, 8 Drawing Sheets

U.S. PATENT DOCUMENTS

| | | | |
|---|---|---|---|
| 5,760,917 A * | 6/1998 | Sheridan | 658/442 |
| 5,793,367 A * | 8/1998 | Taguchi | 345/756 |
| 5,809,331 A * | 9/1998 | Staats et al. | 710/10 |
| 5,809,520 A * | 9/1998 | Edwards et al. | 348/233 |
| 5,850,573 A * | 12/1998 | Wada | 710/62 |
| 5,861,918 A * | 1/1999 | Anderson et al. | 348/231.9 |
| 5,935,208 A * | 8/1999 | Duckwall et al. | 710/104 |
| 5,968,152 A * | 10/1999 | Staats | 710/104 |
| 5,974,475 A * | 10/1999 | Day et al. | 710/9 |
| 5,991,842 A * | 11/1999 | Takayama | 710/105 |
| 5,999,989 A * | 12/1999 | Patel | 710/1 |
| 6,009,479 A * | 12/1999 | Jeffries | 710/8 |
| 6,038,625 A * | 3/2000 | Ogino et al. | 710/9 |
| 6,114,970 A * | 9/2000 | Kirson et al. | 340/825.52 |
| 6,147,708 A * | 11/2000 | Suzuki et al. | 348/232 |
| 6,148,355 A * | 11/2000 | Mahalingam | 710/104 |
| 6,157,411 A * | 12/2000 | Williams et al. | 348/552 |
| 6,266,082 B1 * | 7/2001 | Yonezaw et al. | 348/159 |
| 6,295,086 B1 * | 9/2001 | Fukushima et al. | 348/231 |
| 6,353,868 B1 * | 3/2002 | Takayama et al. | 710/11 |
| 6,418,493 B1 * | 7/2002 | Mosgrove | 710/8 |
| 6,452,629 B1 * | 9/2002 | Aizawa et al. | 348/552 |
| 6,631,426 B1 * | 10/2003 | Staats | 710/9 |
| 2001/0015758 A1 * | 8/2001 | Fichtner | 348/211 |
| 2001/0022618 A1 * | 9/2001 | Ward et al. | 348/211 |
| 2002/0080250 A1 * | 6/2002 | Ogawa et el. | 360/97.01 |
| 2002/0083228 A1 * | 6/2002 | Chiloyan | 710/9 |

FOREIGN PATENT DOCUMENTS

| | | |
|---|---|---|
| JP | 10-126426 A | 5/1998 |
| WO | WO 94/27224 | 11/1994 |

* cited by examiner

DETECTING DEVICE INFORMATION INCLUDING INFORMATION ABOUT A DEVICE

BACKGROUND OF THE INVENTION

1. Field of the Invention

The present invention relates to an information communicating apparatus, a method and a system therefor, and more particularly to technology of communication of digital information with a digital interface.

2. Related Background Art

There has recently been developed a communication system in which a personal computer (PC) is connected with a digital video camera (DVC) through a digital interface and the image taken with the digital video camera is supplied to the personal computer in the form of digital signal and is freely edited on the personal computer.

Among the digital interface technologies usable for constituting such communication system, there is known the IEEE Standard for a High Performance Serial Bus (hereinafter called IEEE 1394-1995 standard).

In the communication system constructed with the digital interface of the IEEE 1394-1995 standard, the communication between the devices is controlled by a node ID, which is the ID information for communication control. The node ID is automatically assigned to each device at each activation of the bus resetting.

The bus resetting is activated at the start of power supply, an addition or a deletion of a device to or from the network, or the reception of a bus reset command from any device. After the bus resetting is activated, the system automatically recognizes the new connection configuration of the network and automatically resets the node ID assigned to each device.

Also, each device constituting the communication system is, in advance, given specific ID information which is not changed by the activation of the bus resetting (hereinafter called the unique ID).

In such a communication system, the node ID may be different before and after the bus resetting, and there has been required a system capable of appropriately handling such change.

Also, in such communication system, it has not been possible to obtain, from the unique ID or the node ID mentioned above, the information indicating the functions or features of each device.

For example, in case of editing or processing, in the personal computer (PC) on the communication system, the image information obtained from the plural digital video cameras (DVC) connected to the same communication system, there are required information on the image taken by each DVC (for example information on the image format or the data compression encoding method) and information on the camera unit provided in each DVC (for example information on the filter).

For obtaining such information, the PC has to follow a predetermined communication procedure utilizing, for example, a command transaction set (CTS). Consequently, the number of communications becomes larger and a very cumbersome procedure is required with the increase of the number of required information or of the number of devices to be inquired.

SUMMARY OF THE INVENTION

An object of the present invention is to solve the above-described drawbacks.

Another object of the present invention is to provide an information communication apparatus capable of recognizing each device and obtaining the information on the functions of each device and on the image, even in case of a change in the connection status of the plural devices.

As a preferred embodiment for such objects, there is disclosed an information communication apparatus connectable to a communication system capable of automatically recognizing the connection status of plural devices, the apparatus comprising:

communication means for inquiring the ID information specific to the device of each of the plural devices; and detection means for detecting, from the ID information, information on the function of the device.

As another embodiment, there is disclosed an information communication apparatus connectable to a communication system capable of automatically recognizing connection status of the plural device, the apparatus comprising:

communication means for inquiring the ID information specific to the device of each of the plural devices;

detection means for detecting, from the ID information, the presence or absence of information on the function of the device; and control means for controlling the readout of information on the function of the device, stored in a predetermined address of the device, according to the result of detection by the detection means.

Still another object of the present invention is to provide an information communication method capable of recognizing each device and easily obtaining information on the functions of each device and on the image, even in case of a change in the connection status of plural devices.

As a preferred embodiment for such object, there is disclosed an information communication method usable in a communication system capable of automatically recognizing connection status of plural devices, the method comprising steps of:

inquiring ID information specific to the device of each of the plural devices; and detecting, from the ID information, information on the function of the device.

As another embodiment, there is disclosed an information communication method usable in a communication system capable of automatically recognizing connection status of the plural device, the method comprising steps of:

inquiring ID information specific to the device of each of the plural devices;

detecting, from the ID information, the presence or absence of information on the function of the device; and controlling the readout of information on the function of the device, stored in a predetermined address of the device, according to the presence or absence of the information on the function of the device.

Still another object of the present invention is to provide an information communication system capable of recognizing each device and easily obtaining information on the functions of each device and on the image, even in case of a change in the connection status of the plural devices.

As a preferred embodiment for such object, there is disclosed an information communication system capable of automatically recognizing connection status of plural devices, the system comprising:

communication means for inquiring, from at least one of the plural devices, ID information specific to the device of each of other devices; and detection means for detecting, from the ID information, information on the function of the device.

As another embodiment, there is disclosed an information communication system capable of automatically recognizing the connection status of the plural device, the system comprising:

communication means for inquiring, from a first device, the ID information specific to the device of each of other devices;

detection means for detecting, from the ID information, the presence or absence of information on the function of the device; and control means for controlling the readout of information on the function of the device, stored in a predetermined address of the device, according to the result of detection by the detection means.

As another embodiment, there is disclosed an apparatus which detects device information including information about a device, the apparatus comprising:

a control unit which obtains first ID information specific to the device via a digital interface after second ID information is assigned to the device, wherein the first ID information includes the device information, and the second ID information is used for communicating with the device;

a memory which is coupled to the control unit, and stores the first ID information and the second ID information; and a detecting unit which detects the device information from the first ID information, wherein if a new second ID information is assigned to the device, the control unit checks the new second ID information using the first ID information.

As another embodiment, there is disclosed an apparatus which detects whether device information including information about a device is present in a predetermined address, the apparatus comprising:

a control unit which obtains first ID information specific to the device via a digital interface after second ID information is assigned to the device, wherein the first ID information includes information indicating whether the device information is present in the predetermined address, and the second ID information is used for communicating with the device;

a memory which is coupled to the control unit, and stores the first ID information and the second ID information; and a detecting unit which detects whether the device information is present in he predetermined address using the information included in the first ID information.

As another embodiment, there is disclosed a method of detecting device information including information about a device, the method comprising the steps of:

obtaining first ID information specific to the device via a digital interface after second ID information is assigned to the device, wherein the first ID information includes the device information, and the second ID information is used for communicating with the device;

storing in a memory the first ID information and the second ID information;

detecting the device information from the first ID information; and checking a new second ID information using the first ID information, if the new second ID information is assigned to the device.

As another embodiment, there is disclosed a method of detecting whether device information including information about a device is present in a predetermined address, the method comprising the steps of:

obtaining first ID information specific to the device via a digital interface after second ID information about the desired device, wherein the first ID information includes information indicating whether the device information is present in the predetermined address, and the second ID information is used for communicating with the device;

storing in a memory the first ID information and the second ID information; and detecting whether the device information is present in the predetermined address using the information included in the first ID information.

Still other objects of the present invention, and the features thereof, will become fully apparent from the following detailed description of the embodiments.

DESCRIPTION OF THE PREFERRED EMBODIMENTS

The preferred embodiments of the present invention will now be described in detail hereinafter with reference to the accompanying drawings.

First Embodiment

Figure 1:
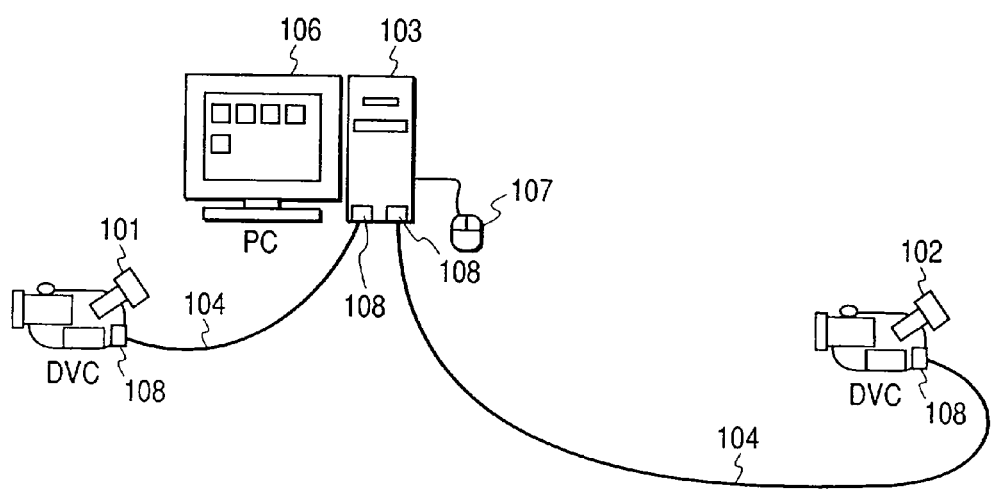
FIG. 1 is a view showing the configuration of an information communication system constituting a first embodiment.

FIG. 1 is a block diagram showing the configuration of an information communication system constituting a first embodiment of the present invention. The information communication system of the present embodiment is a serial bus communication system constituted with the digital interface based on the IEEE 1394 standard. In the communication system of the present system, all of the employed devices are from a same manufacturer.

In FIG. 1, there are shown digital video cameras (DVC) 101, 102 each including an image taking unit for taking the optical image of an object and a digital interface 108 for outputting the image information taken with the image taking unit.

In FIG. 1, there is also shown a personal computer (PC) 103 including a display device 106 capable of displaying the image information from the DVCs 101, 102 and information (for example, an icon) indicating the DVCs 101, 102, and an operation device 107 for inputting predetermined operations based on the display image on the display device 106. The PC 103 also has a function receiving the image information, taken by the DVCs 101, 102 through the digital interfaces 108, and editing such image information.

In FIG. 1 there are also shown serial bus cables 104 for connecting the digital interfaces 108 provided in the DVCs 101, 102 and the PC 103.

Figure 2:
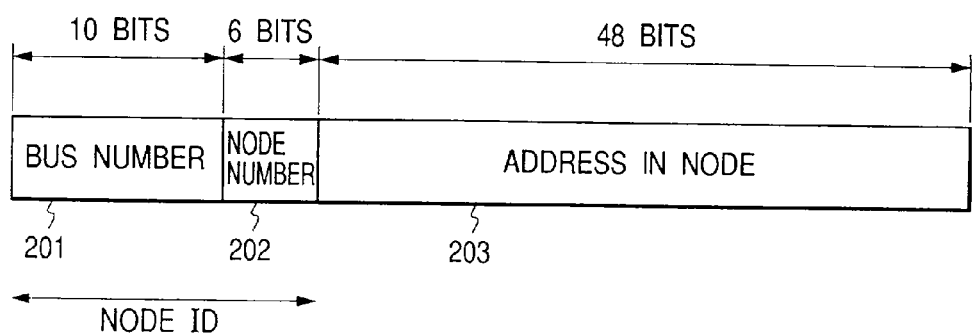
FIG. 2 is a view showing the configuration of a node ID set in each device (node)

FIG. 2 shows the configuration of a node ID equipped in each device (node).

Referring to FIG. 2, a node ID (201, 202) has a 64-bit address space and is set in each of the DVCs 101, 102 and the PC 103 by a method based on the IEEE 1394 standard. The node ID mentioned above is reset, in case of bus resetting in the communication system shown in FIG. 1, with the automatic recognition of the connection configuration of the communication system. The bus resetting is activated in response, for example, to the start of power supply, addition or deletion of a device on the communication system or a resetting request command from a device on the communication system.

Referring to FIG. 2, a node number 202 is represented by 6 bits to enable connection of 63 devices at maximum (sixty-third number being used for broadcasting) in a local communication system. A bus number 201 is represented by 10 bits to enable connection of 1023 communication systems at maximum (one thousand twenty-third number being used for indicating a local bus), like the one shown in FIG. 1, through bridges.

Communication between the nodes can be conducted utilizing the node ID (201, 202) set for each node and a 48-bit address 203 designating the address space of each node (more specifically the address space in the configuration ROM). For example, in case the address 203 designates an exchange of command etc., a command transaction set (CTS) is transmitted based on a predetermined protocol (such as AV/C protocol for AV equipment control). Also, in case the address 203 designates an address managing the timer provided in each node, the timing of the communication cycle is controlled.

Figure 3:
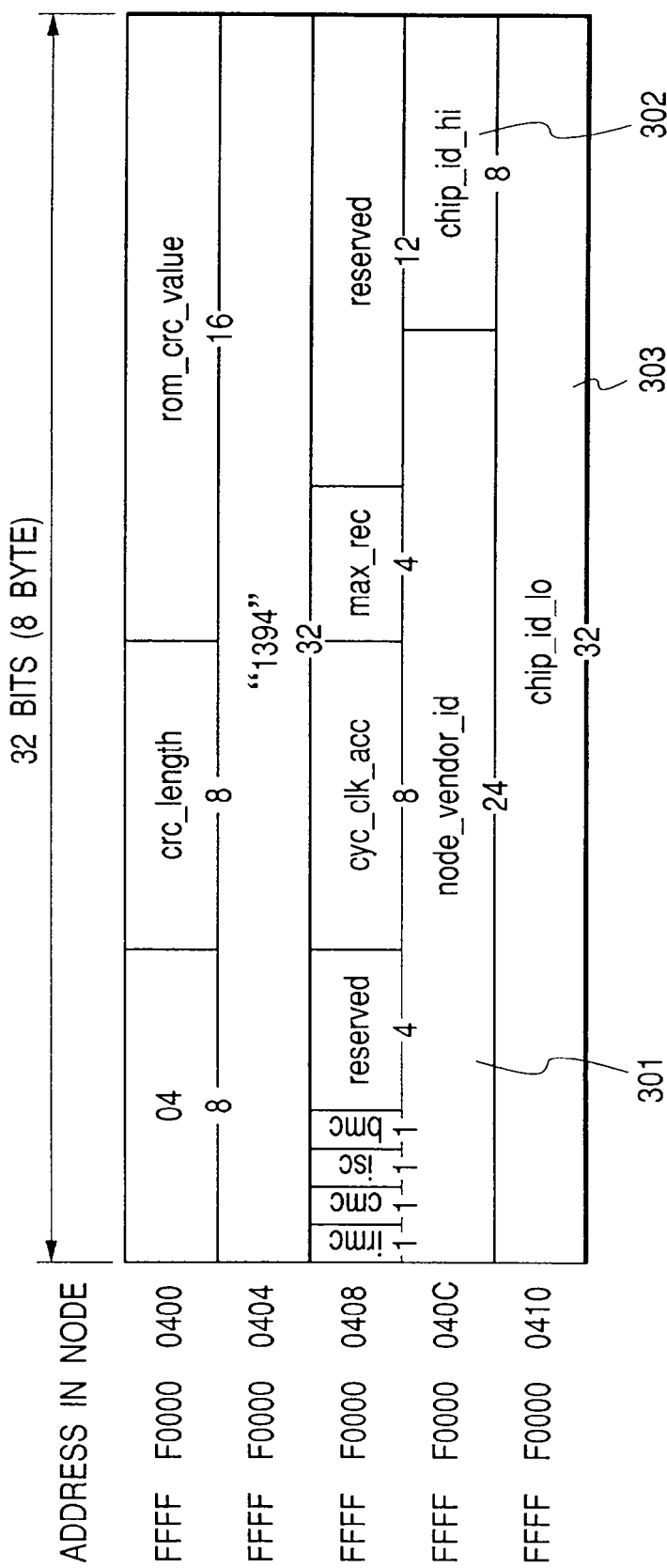
FIG. 3 is a view showing a part of a configuration ROM of the first embodiment.

FIG. 3 shows a part of the configuration ROM equipped in the digital interface of the first embodiment. Under the IEEE 1394 standard, each node is provided with a configuration ROM for providing various information.

Referring to FIG. 3, the configuration ROM stores predetermined information in the addresses from FFFF F000 0400 to FFFF F000 0410, particularly ID information specific to each node (hereinafter called unique ID) in the addresses FFFF F000 040C and FFFF F000 0410.

As shown in FIG. 3, the unique ID stored in the addresses FFFF F000 040C and FFFF F000 0410 are composed of a vendor ID 301 of 3 bytes and a chip ID 302, 303 of 5 bytes. The vendor ID 301 is acquired by each vendor by an application to the IEEE and specifies the vendor. The chip ID 302, 303 is arbitrarily assigned by each vendor in such a manner that each node has a unique ID. Thus the unit ID (301–303) of each node does not occur in any other nodes.

In the present embodiment, even in case of a change in the node ID due to a bus resetting in the course of communication, the unique ID (301–303) of each device is used to investigate the change in the reset node ID (201, 202) whereby the communication can be restarted after the bus resetting.

Figure 4:
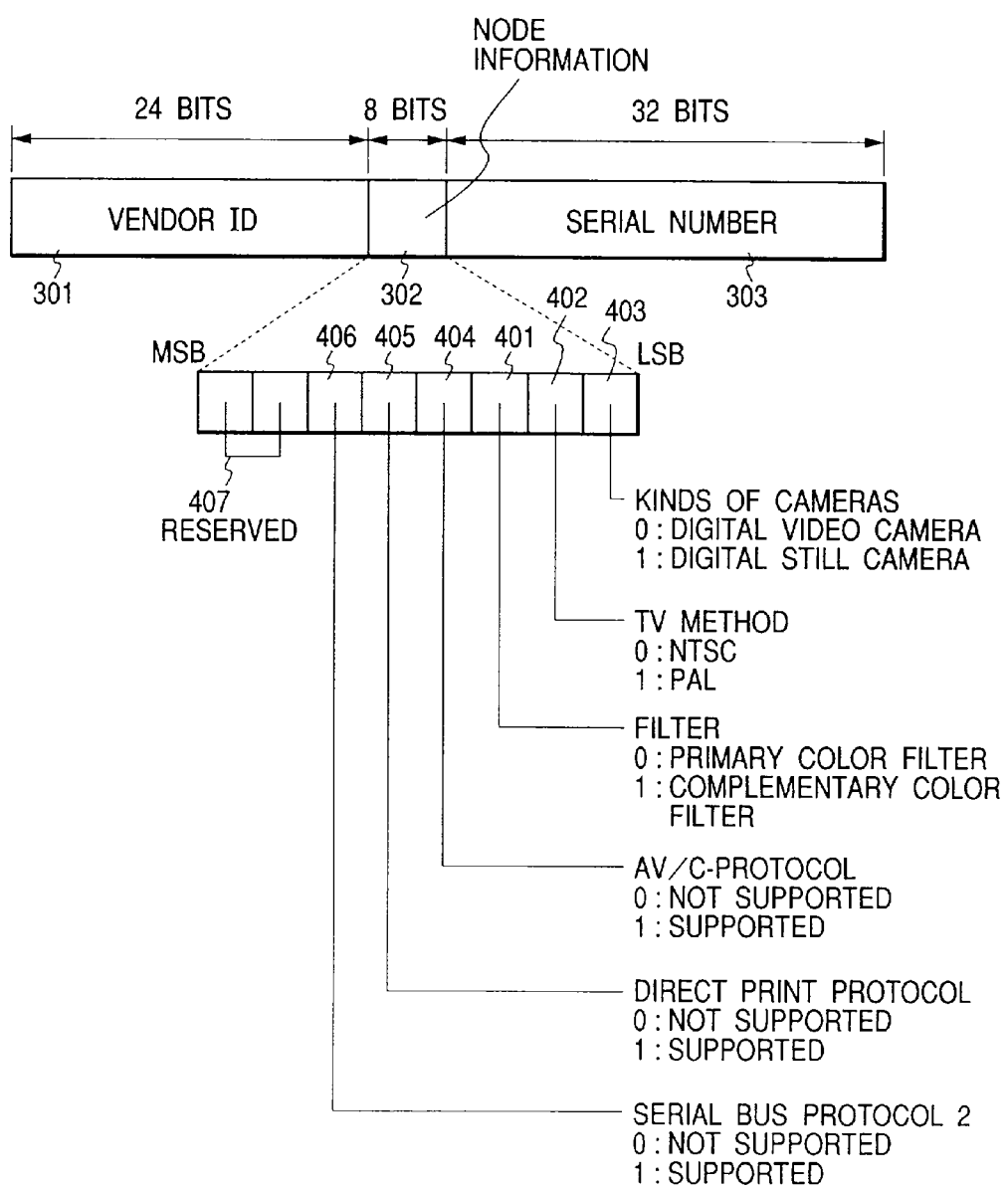
FIG. 4 is a view showing the detailed configuration of the unique ID (301–303) in the first embodiment.

FIG. 4 is a view showing the detailed configuration of the unique ID (301–303) of the first embodiment. In the present embodiment, the chip ID 302, 303 in the above-mentioned unique ID (301–303) is provided with an area for storing information indicating the functions of each device (such information being hereinafter called node information).

In the present embodiment, the node information more specifically indicates information relating to the image information provided in the specified node, for example information required for transmitting, editing or processing the image information.

Referring to FIG. 4, 1 byte (8 bits) of the chip ID 302, 303, namely the area of chip ID 302, is used for such node information. Also a serial number, specific to each device, is given in the remaining 5-byte (40-bit) chip ID area 303. Thus the unique ID of each device includes the node information of the device itself and becomes specific ID information different from that of any other device. The node information mentioned above is stored in "chip_id_hi" in the configuration ROM shown in FIG. 3.

Referring to FIG. 4, information 401 indicates the kind of the CCD filter provided in the camera unit of each node (for example "0" for primary color filters and "1" for complementary color filters). This information can be used for executing predetermined color management process on the image information in each node.

Information 402 indicates the image format of the image information generated in each node (for example "0" for NTSC system and "1" for PAL system). This information can be used for executing predetermined display process on the image information of each node.

Information 403 indicates the kind of the node (for example "0" for a digital video camera and "1" for a digital still camera). This information allows specification of the type of the image information (namely moving image or still image) that can be provided from each node and allows execution of a matching image process.

Also in FIG. 4, information 404–406 indicate the communication protocol supported by each node. Information 404 indicates the communication protocol (AV/C protocol) controlling the communication of the moving image/voice data of an AV device, information 405 indicates the communication protocol (direct print protocol) controlling the communication of the still image of the AV device with the printer, and information 406 indicates the communication protocol (serial bus protocol 2) controlling the communication with a device such as a scanner, a hard disk, a DVD player, a CD-ROM player or a PC. A protocol is supported or not, respectively, if the data stored in the corresponding field is "1" or "0", and some devices may support all the protocols. This information 404–406 allows control of the communication of the image information in each mode.

Further referring to FIG. 4, a 2-bit remaining area 407 of the 8-bit chip ID 302 is reserved for other node information.

By the presence of such fields in the chip ID 302, each node can know its own node information (particularly the supported communication protocol) together with the unique ID.

Figure 5:
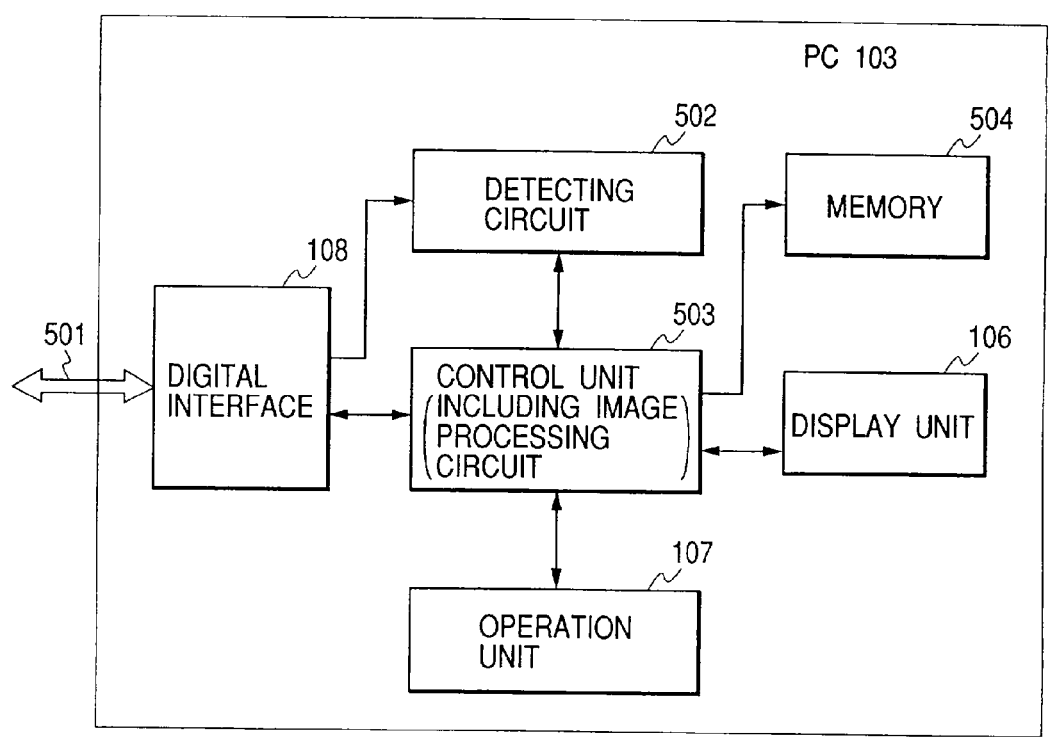
FIG. 5 is a view showing the configuration of a PC 103.

FIG. 5 shows the configuration of the personal computer 103 shown in FIG. 1.

In FIG. 5, there are shown a serial bus cable 501; a detection circuit 502 for detecting the node information from the unique ID entered through the digital interface 108; a control unit 503 including a microcomputer and adapted to control the functions of various process units of the personal computer 103; and a memory 504 for storing the unique ID entered through the digital interface 108 in combination with the node ID used in inquiring the unique ID.

In particular, the control unit 503 controls the digital interface 108 based on the result of detection (more specifically the communication protocol information shown in FIG. 4) of the detection circuit 502, thereby controlling the communication with the specified node. Also the control circuit 503 includes an image processing circuit for executing predetermined image processing based on the result of detection by the detection circuit 502.

Figure 6:
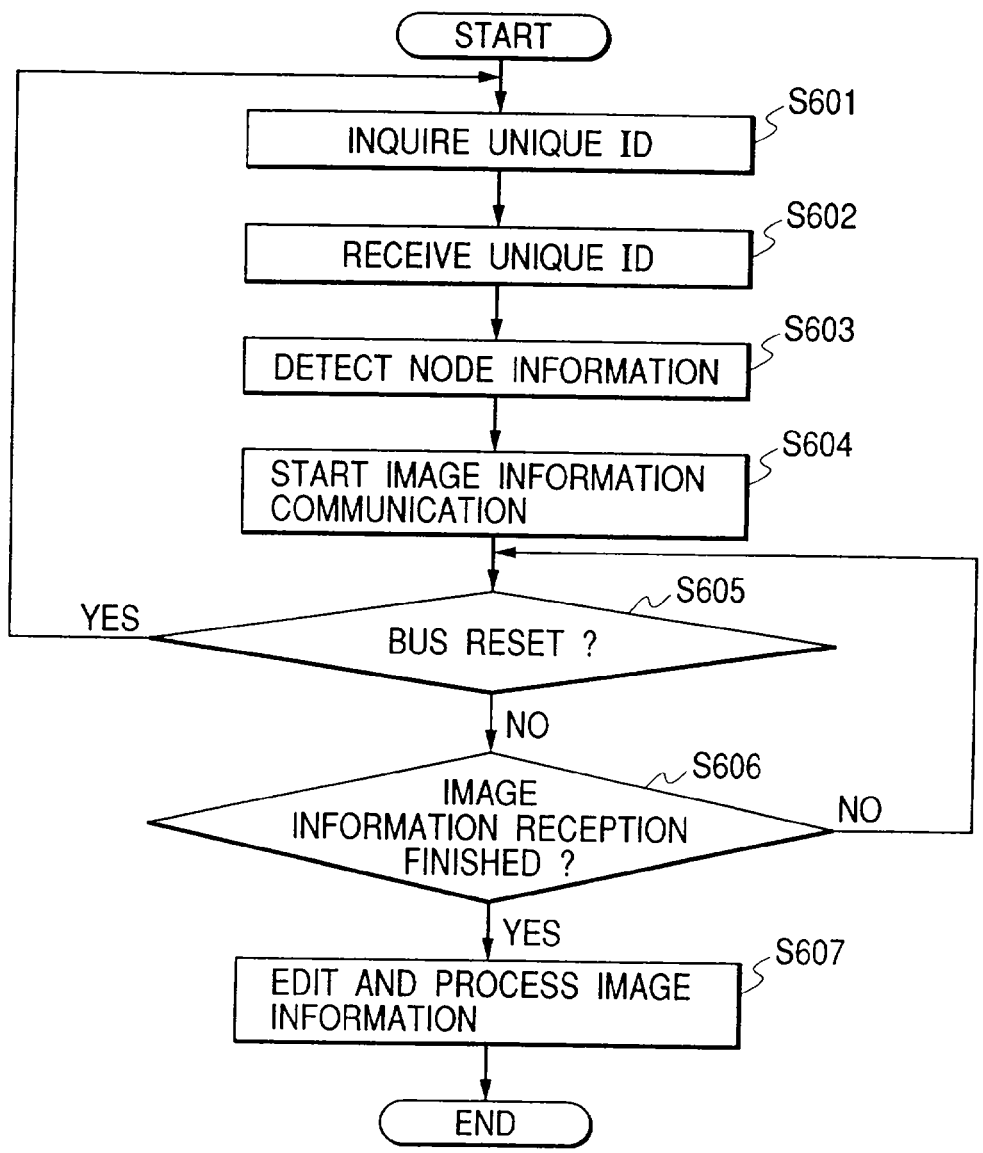
FIG. 6 is a flow chart showing the control sequence of the PC 103 in the first embodiment.

FIG. 6 is a flow chart showing the control sequence of the PC 103 of the first embodiment.

After the construction of the communication system shown in FIG. 1 and the setting of the node ID in each device, the PC 103 outputs packet data for inquiring the unique ID of each device from the digital interface 108 (step S601).

In response to such inquiry, each of the two DVCs 101, 102 on the communication system reads the vendor ID 301 and the chip ID 302, 303 from the addresses FFFF F000 040C and FFFF F000 0410 of the configuration ROM provided in each device and returns packet data containing such ID information. The PC 103 receives the packet data (containing the unique ID), transmitted from the DVCs 101, 102, through the digital interface 108 (step S602).

The digital interface 108 supplies the detection circuit 502 with the unique ID contained in the entered packet data. The detection circuit 502 stores the unique ID of the DVCs 101, 102 in correspondence with the node ID set for each DVC in the memory 504, and detects and sends the node information, relating to the function and the feature of the DVCs 101, 102, to the control unit 503 (step S603).

The control unit 503 controls the digital interface 108 based on the result of detection by the detection circuit 502 (more specifically the communication protocol information shown in FIG. 4), and initiates the communication of image information with a specified device (step S604).

For example, the control unit 503 can recognize, from the unique ID of the DVC 101, the kind of the communication protocol supported thereby. If the DVC 101 is identified to support the AV/C protocol, the control unit 503 so controls the digital interface 108 as to effect communication with the DVC 101 utilizing CTS of the AV/C protocol.

In case of a bus resetting in the course of communication, the PC 103 again stores the node ID re-set on each device and the unique ID identifying each device in mutual correspondence, in the memory 504. In this manner the PC 103 can maintain the communication before and after the bus resetting (step S605).

After the reception of the image information based on the predetermined communication protocol (step S606), the control unit 503 executes, on such image information, image processing based on the node information obtained from the unique ID of each device (step S607).

Thus, the control unit 503 of the PC 103 can execute various controls on the image information entered from the DVCs 101, 102 through the digital interface 108, such as display on the display unit 106, editing and processing with an editing application program, storage in a memory device such as a hard disk, or printing with an unrepresented printer.

For example, the control unit 503 identifies the CCD filter information 401, image format information 402 and information 403 indicating the kind of node from the node information 302 of the unique ID of the DVC 101. Identifying that the DVC 101 is a digital video camera based on the node kind information 403, the PC 103 initiates communication for entering the image information from the DVC 101 according to an instruction of the user. Having received the image information from the DVC 101, the PC 103 applies a signal processing based on the image format information 402 on the input data, and causes the display unit 106 to display such image data. Also the PC 103 executes a color management process on the entered image information based on the CCD filter information 401, thereby obtaining color reproduction on the display unit 106 close to the original color.

As explained in the foregoing, the communication system of the first embodiment is capable, at each bus resetting, of forming correspondence between the node ID assigned to each node and the unique ID thereof, thereby adapting to the change of node ID by the bus resetting.

It is also rendered possible, by setting the above-mentioned node information in the unique ID of each device, to easily obtain the node information of each device.

Second Embodiment

In the following there will be explained the communication system of a second embodiment with reference to FIG. 1. In the following second embodiment, components same as or equivalent to those in the first embodiment will be represented by same numbers as those in the first embodiment and will not be explained further.

Figure 7:
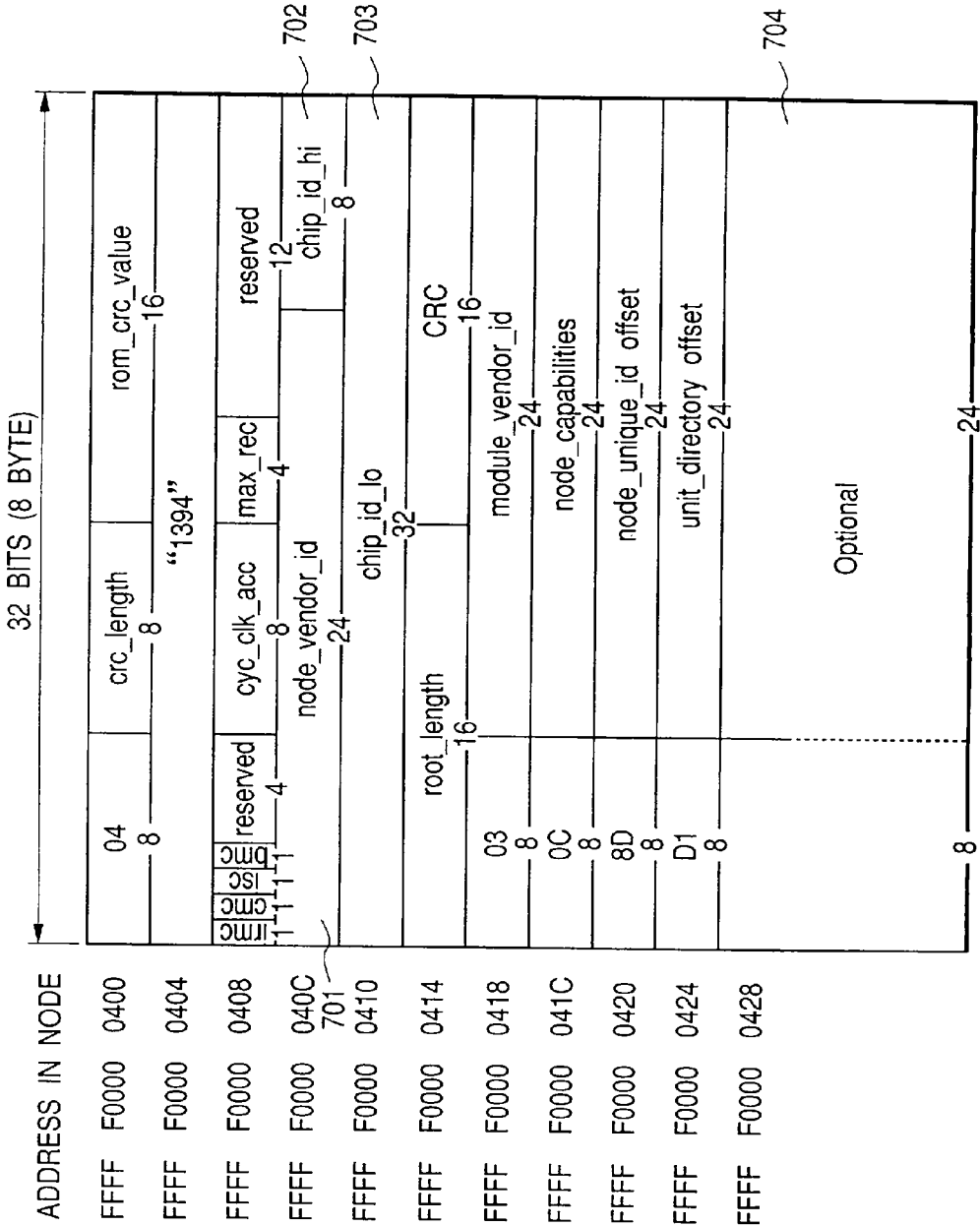
FIG. 7 is a view showing a part of the configuration ROM of the second embodiment.

FIG. 7 is a view showing a part of the configuration ROM provided in the digital interface 108 of the second embodiment. As in the first embodiment, each node can read the unique ID specific to each node, from the addresses FFFF F000 040C and FFFF F000 0410 of the configuration ROM.

Referring to FIG. 7, the addresses FFFF F000 040C and FFFF F000 0410 store, as in the first embodiment, a 3-byte vendor IC 701 and a 5-byte chip ID 702, 703.

Consequently, even in case of a change in the node ID of the devices in the course of a communication, the communication system of the present embodiment can investigate the change in the reset node ID (201, 202) utilizing such node ID (701–703) and can re-start the communication after the bus resetting.

Figure 8:
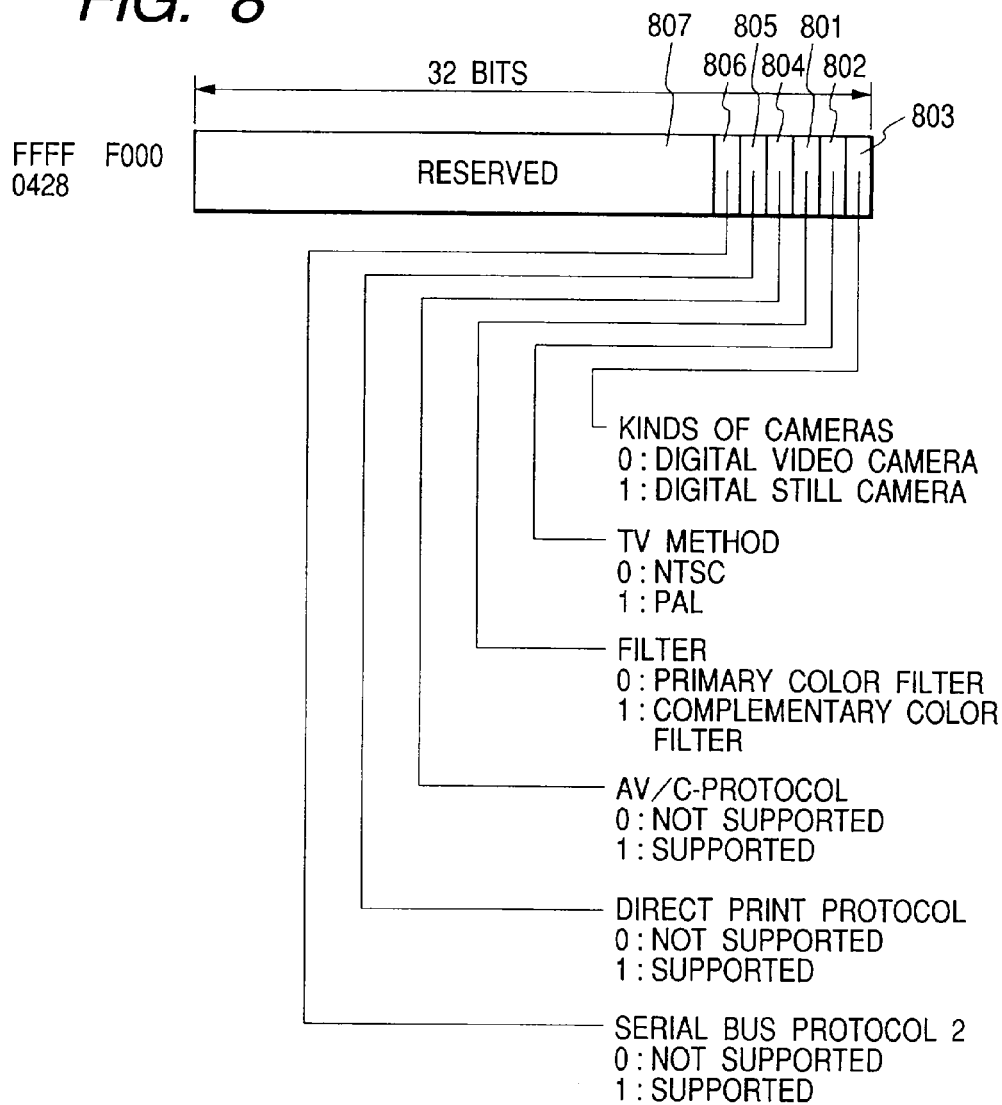
FIG. 8 is a view showing the configuration of node information stored in a predetermined address of the configuration ROM.

In FIG. 7, an area 704 starting from an address FFFF F000 0428 in the configuration ROM constitutes an optional area arbitrarily usable by each vendor. In the present embodiment, the node information of each node is stored in a predetermined address in such optional area 704. FIG. 8 shows the configuration of the node information stored in an address FFFF F000 0428.

As in the first embodiment, the node information indicates the functions equipped in each device, and more specifically relates to the image information provided in each device.

Also in FIG. 8, information 801 indicates the kind of the CCD filter provided in the camera unit of each node (for example "0" for primary color filters and "1" for complementary color filters). Information 802 indicates the image format of the image information generated in each node (for example "0" for NTSC system and "1" for PAL system). Information 803 indicates the kind of the node (for example "0" for a digital video camera and "1" for a digital still camera).

Also referring to FIG. 8, information 804–806 indicate communication protocol information supported by the nodes. Information 804 indicates the above-mentioned AV/C protocol, information 805 indicates the direct print protocol, and information 806 indicates serial bus protocol 2. A protocol is supported or not, respectively, if the data stored in the corresponding filed is "1" or "0", and some devices may support all the protocols. This information 804–806 allows the control of the communication of the image information in each node.

Further referring to FIG. 8, an area 807 is reserved for other node information.

Figure 9:
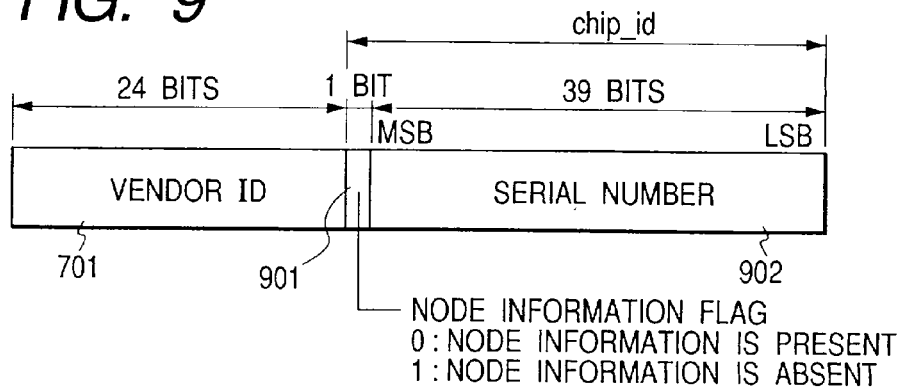
FIG. 9 is a view showing the detailed configuration of the unique ID (901–903) in the second embodiment.

In the present embodiment, there is provided, in the chip ID 702, 703 in the unique ID (701–703) shown in FIG. 7, with an area indicating whether the configuration ROM of each device has the above-mentioned node information. FIG. 9 shows the configuration of the unique ID in the second embodiment.

In FIG. 9, a 1-bit area 901 of the chip ID 702 is used for a flag indicating whether the node information is contained in a predetermined area 704 of the configuration ROM. A remaining 39-bit area 902 is used for storing a serial number specific to each device. Thus the unique ID of each device becomes different from that of any other devices and also contains information indicating whether the node information of the own device is present.

In FIG. 9, a node information flag 901 "1" or "0" respectively indicates the presence or absence of the node information in the predetermined area 704 of the configuration ROM.

Figure 10:
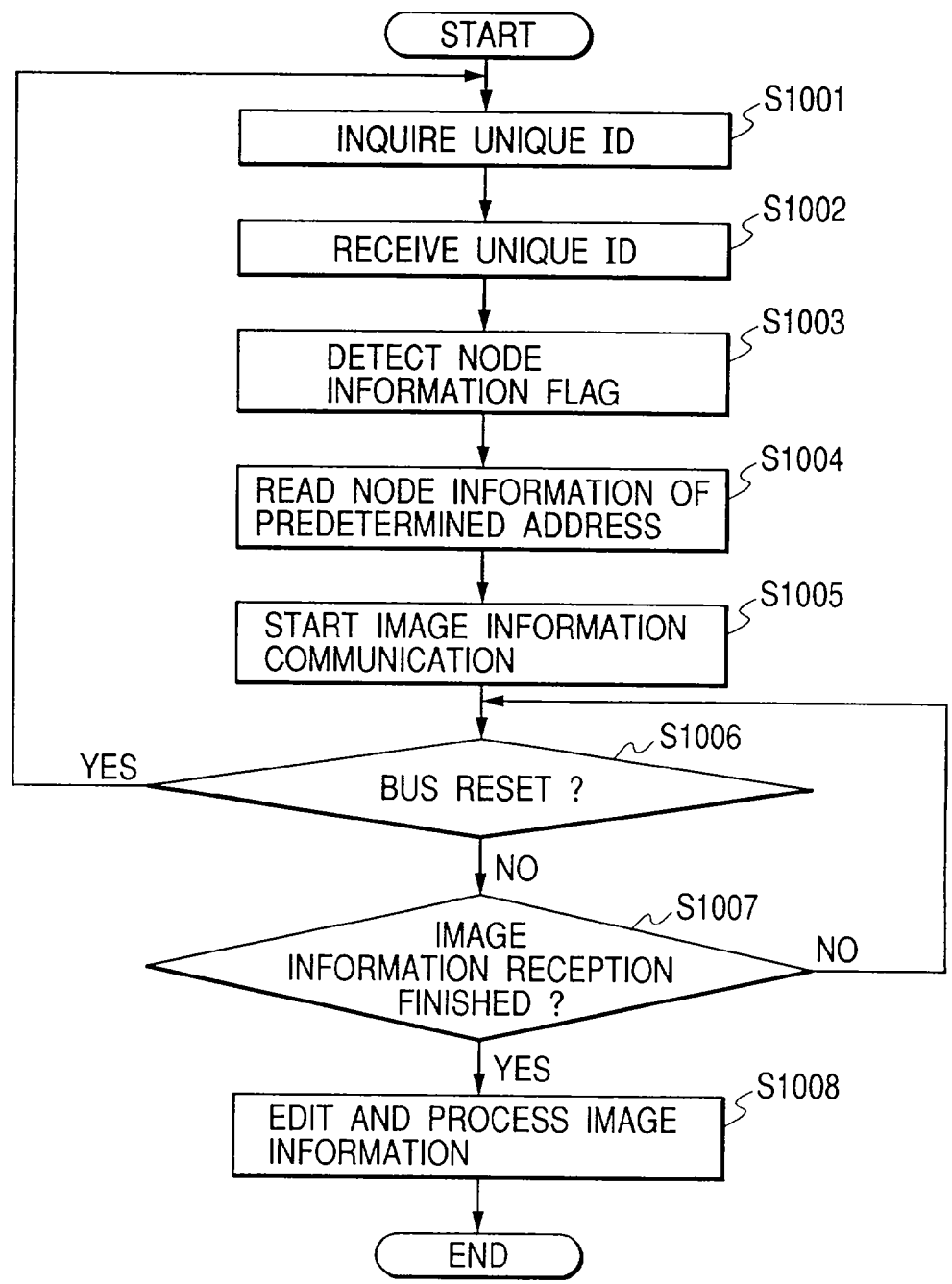
FIG. 10 is a flow chart showing the control sequence of the PC 103 in the second embodiment.

FIG. 10 is a flow chart showing the control sequence of the PC 103 of the second embodiment. In the second embodiment, the PC 103 is constructed as shown in FIG. 5.

In the communication system of the second embodiment, after the setting of the node ID in each device, the PC 103 outputs packet data for inquiring the unique ID of each device from the digital interface 108 (step S1001).

In response to such inquiry, each of the two DVCs 101, 102 on the communication system reads the vendor ID 701 and the chip ID 702, 703 from the addresses FFFF F000 040C and FFFF F000 0410 of the configuration ROM provided in each device and returns packet data containing such ID information. The PC 103 receives the packet data (containing the unique ID), transmitted from the DVCs 101, 102, through the digital interface 108 (step S1002).

The digital interface 108 supplies the detection circuit 502 with the unique ID contained in the entered packet data. The detection circuit 502 stores the unique ID of the DVCs 101, 102 in correspondence with the node ID set for each DVC in the memory 504. It also detects, from the node information flag 801 of each unique ID, whether the node information, relating to the function and the feature of the node, is present in the area 704 of the configuration ROM of the DVCs 101, 102 and sends the result of detection to the control unit 503 (step S 1003).

If the node information flag 801 of the unique ID of each device is "0", the control unit 503 reads the node information (801–807) stored in the address FFFF F000 0428 of the configuration ROM of each device (step S1004).

The control unit 503 controls the digital interface 108 based on the node information read from the DVC 101 or 102 (more specifically the communication protocol information shown in FIG. 8), and initiates the communication of image information with the device (step S1005).

For example, the control unit 503 can recognize, from the unique ID of the DVC 101, the kind of the communication protocol supported thereby. If the DVC 101 is identified to support the AV/C protocol, the control unit 503 so controls the digital interface 108 as to effect communication with the DVC 101 utilizing CTS of the AV/C protocol.

In case of a bus resetting in the course of communication, the PC 103 again stores the node ID re-set on each device and the unique ID identifying each device in mutual correspondence, in the memory 504. In this manner the PC 103 can maintain the communication before and after the bus resetting (step S1006).

After the reception of the image information based on the predetermined communication protocol (step S1007), the control unit 503 executes, on such image information, image processing based on the node information read from the configuration ROM of each device (step S1008).

Thus the control unit 503 of the PC 103 can execute various controls on the image information entered from the DVC's 101, 102 through the digital interface 108, such as display on the display unit 106, editing and processing with an editing application program, storage in a memory device such as a hard disk, or printing with an unrepresented printer. The memory 504 can also record the node information of each device, obtained by the inquiry of the control unit 503, in correspondence with the unique ID.

For example, the control unit 503 identifies the CCD filter information 801, image format information 802 and information 803 indicating the kind of node from the node information stored in the address FFFF F000 0428 of the configuration ROM equipped in the DVC 101. Identifying that the DVC 101 is a digital video camera based on the node kind information 803, the PC 103 initiates communication for entering the image information from the DVC 101 according to an instruction of the user. Having received the image information from the DVC 101, the PC 103 applies a signal processing based on the image format information 802 on the input data, and causes the display unit 106 to display such image data. Also the PC 103 executes a color management process on the entered image information based on the CCD filter information 801, thereby obtaining color reproduction on the display unit 106 close to the original color.

As explained in the foregoing, the communication system of the second embodiment is capable, at each bus resetting, of forming correspondence between the node ID assigned to each node and the unique ID thereof, thereby adapting to the change of node ID by the bus resetting.

It is also rendered possible, by setting the flag indicating whether the above-mentioned node information is stored in the predetermined address of the configuration ROM, in the unique ID of each device, to easily obtain the node information of each device.

The invention may be embodied in other specific forms without departing from the spirit or essential characteristics thereof.

For example, the foregoing embodiments have been explained by communication systems constructed with the digital interfaces based on the IEEE 1394 standard, but the present invention is not limited to such embodiments.

The present invention is applicable to any communication system capable of automatically re-recognizing the connection status, in which the change in the communication controlling ID, set in each re-recognizing process, can be correlated with the ID information specific to each device.

Therefore, the above-mentioned embodiments are merely examples in all respects, and must not be construed to limit the invention.

The scope of the present invention is defined by the scope of the appended claims, and is not limited at all by the specific descriptions of this specification. Furthermore, all the modifications and changes belonging to equivalents of the claims are considered to fall within the scope of the present invention.

What is claimed is:

1. An apparatus which detects device information including information about a device, said apparatus comprising:

a control unit which obtains first ID information specific to the device via a digital interface after second ID information is assigned to the device, wherein the first ID information includes the device information, and the second ID information is used for communicating with the device;

a memory which is coupled to the control unit, and stores the first ID information and the second ID information; and a detecting unit which detects the device information from the first ID information, wherein if a new second ID information is assigned to the device, the control unit checks the new second ID information using the first ID information.

2. An apparatus according to claim 1, wherein the device information includes information indicating whether the device supports a predetermined image format.

3. An apparatus according to claim 1, wherein the device information includes information indicating whether the device supports a predetermined communication protocol.

4. An apparatus according to claim 1, wherein the device information includes information indicating a device type of the device.

5. An apparatus according to claim 1, wherein the digital interface conforms to the IEEE 1394 standard, and the second ID information is a node ID in the IEEE 1394 standard.

6. An apparatus according to claim 1, wherein the device information includes information indicating whether the device is a digital video camera.

7. An apparatus according to claim 1, wherein the first ID information includes a vendor ID and a serial number of the device.

8. An apparatus which detects whether device information including information about a device is present in a predetermined address, said apparatus comprising:

a control unit which obtains first ID information specific to the device via a digital interface after second ID information is assigned to the device, wherein the first ID information includes information indicating whether the device information is present in the predetermined address, and the second ID information is used for communicating with the device;

a memory which is coupled to the control units, and stores the first ID information and the second ID information; and a detecting unit which detects whether the device information is present in the predetermined address using the information included in the first ID information.

9. An apparatus according to claim 8, wherein the device information includes information indicating whether the device supports a predetermined image format.

10. An apparatus according to claim 8, wherein the device information includes information indicating whether the device supports a predetermined communication protocol.

11. An apparatus according to claim 8, wherein the device information includes information indicating a device type of the device.

12. An apparatus according to claim 8, wherein the digital interface conforms to the IEEE 1394 standard, and the second ID information is a node ID in the IEEE 1394 standard.

13. An apparatus according to claim 8, wherein the device information includes information indicating whether the device is a digital video camera.

14. An apparatus according to claim 8, wherein the first ID information includes a vendor ID and a serial number of the device.

15. An apparatus according to claim 8, wherein if a new second ID information is assigned to the device, the control unit checks the new second ID information using the first ID information.

16. A method of detecting device information including information about a device, said method comprising the steps of:

obtaining first ID information specific to the device via a digital interface after second ID information is assigned to the device, wherein the first ID information includes the device information, and the second ID information is used for communicating with the device;

storing in a memory the first ID information and the second ID information;

detecting the device information from the first ID information; and checking a new second ID information using the first ID information, if the new second ID information is assigned to the device.

17. A method according of claim 16, wherein the device information includes information indicating whether the device supports a predetermined image format.

18. A method according to claim 16, wherein the device information includes information indicating whether the device supports a predetermined communication protocol.

19. A method according to claim 16, wherein the device information includes information indicating a device type of the device.

20. A method according to claim 16, wherein the digital interface conforms to the IEEE 1394 standard, and the second ID information is a node ID in the IEEE 1394 standard.

21. A method according to claim 16, wherein the device information includes information indicating whether the device is a digital video camera.

22. A method according to claim 16, wherein the first ID information includes a vendor ID and a serial number of the device.

23. A method of detecting whether device information including information about a device is present in a predetermined address, said method comprising the steps of:

obtaining first ID information specific to the device via a digital interface after second ID information about the desired device, wherein the first ID information includes information indicating whether the device information is present in the predetermined address, and the second ID information is used for communicating with the device;

storing in a memory the first ID information and the second ID information; and detecting whether the device information is present in the predetermined address using the information included in the first ID information.

24. A method according to claim 23, wherein the device information includes information indicating whether the device supports a predetermined image format.

25. A method according to claim 23, wherein the device information includes information indicating whether the device supports a predetermined communication protocol.

26. A method according to claim 23, wherein the device information includes information indicating a device type of the device.

27. A method according to claim 23, wherein the digital interface conforms to the IEEE 1394 standard, and the second ID information is a node ID in the IEEE 1394 standard.

28. A method according to claim 23, wherein the device information includes information indicating whether the device is a digital video camera.

29. A method according to claim 23, wherein the first ID information includes a vendor ID and a serial number of the device.

30. A method according to claim 23, further comprising a step of checking a new second ID information using the first ID information stored in the memory, if the new second ID information is assigned to the device.

* * * * *

UNITED STATES PATENT AND TRADEMARK OFFICE
CERTIFICATE OF CORRECTION

PATENT NO. : 7,071,972 B2  Page 1 of 1
APPLICATION NO. : 09/139397
DATED : July 4, 2006
INVENTOR(S) : Shinichi Koyama It is certified that error appears in the above-identified patent and that said Letters Patent is hereby corrected as shown below:

<u>COLUMN 3</u>:
Line 49, "he" should read -- the --.

<u>COLUMN 11</u>:
Line 34, "units," should read -- unit, --.

Signed and Sealed this

Thirtieth Day of January, 2007

JON W. DUDAS
*Director of the United States Patent and Trademark Office*